United States Patent
Wynn

(10) Patent No.: US 6,236,211 B1
(45) Date of Patent: May 22, 2001

(54) INDUCED POLARIZATION METHOD USING TOWED CABLE CARRYING TRANSMITTERS AND RECEIVERS FOR IDENTIFYING MINERALS ON THE OCEAN FLOOR

(75) Inventor: Jeffrey C. Wynn, Sterling, VA (US)

(73) Assignee: The United States of America as represented by the United States Secretary of the Interior, Washington, DC (US)

( * ) Notice: Subject to any disclaimer, the term of this patent is extended or adjusted under 35 U.S.C. 154(b) by 0 days.

(21) Appl. No.: 09/099,149

(22) Filed: Jun. 18, 1998

(51) Int. Cl.$^7$ .................................................. G01V 3/02
(52) U.S. Cl. .................................... 324/365; 324/357
(58) Field of Search .................................. 324/347, 354, 324/357, 358, 360, 362, 363, 364, 365, 326, 345

(56) References Cited

U.S. PATENT DOCUMENTS

| | | |
|---|---|---|
| 2,531,088 | 11/1950 | Thompson . |
| 2,839,721 | 6/1958 | Witte . |
| 2,872,638 | 2/1959 | Jones . |
| 3,052,836 | 9/1962 | Postma . |
| 3,182,250 | 5/1965 | Mayes . |
| 3,562,633 | 2/1971 | Swain . |
| 3,984,759 | * 10/1976 | St-amant et al. ................ 324/362 |
| 4,041,372 | * 8/1977 | Miller et al. .................... 324/357 |
| 4,467,642 | * 8/1984 | Givens ........................... 324/362 |
| 4,617,518 | 10/1986 | Srnka . |
| 5,430,380 | 7/1995 | Wynn et al. . |
| 5,671,136 | * 9/1997 | Willhoit, Jr. .................... 702/18 |

OTHER PUBLICATIONS

Jeffrey C. Wynn, "Titanium geophysics: The application of induced polarization to sea–floor mineral exploration"; Geophysics, vol. 53, pp. 386–401, Mar. 1998.*

* cited by examiner

*Primary Examiner*—Jay Patidar
(74) *Attorney, Agent, or Firm*—E. Philip Koltos

(57) ABSTRACT

A method is provided for detecting minerals and metal-containing materials which are located in sediment deposits on the sea floor and which exhibit an induced polarization response. In this method, a streamer cable is towed in the sea behind a ship. The cable has transmitters and receivers at the free end thereof and the cable is towed such that this free end is close to or trenches into the sea floor. The transmitters are used to transmit a square wave electrical current into the sediment of the sea floor while the receivers are used detect to any secondary signals produced by an induced polarization source located on or in the sea floor in response to the electrical current. The secondary signals are processed to determine measurement parameters characteristic of the source of the secondary signals so as to identify the source and using simultaneously acquired global positional data, to determine the location of the source.

9 Claims, 2 Drawing Sheets

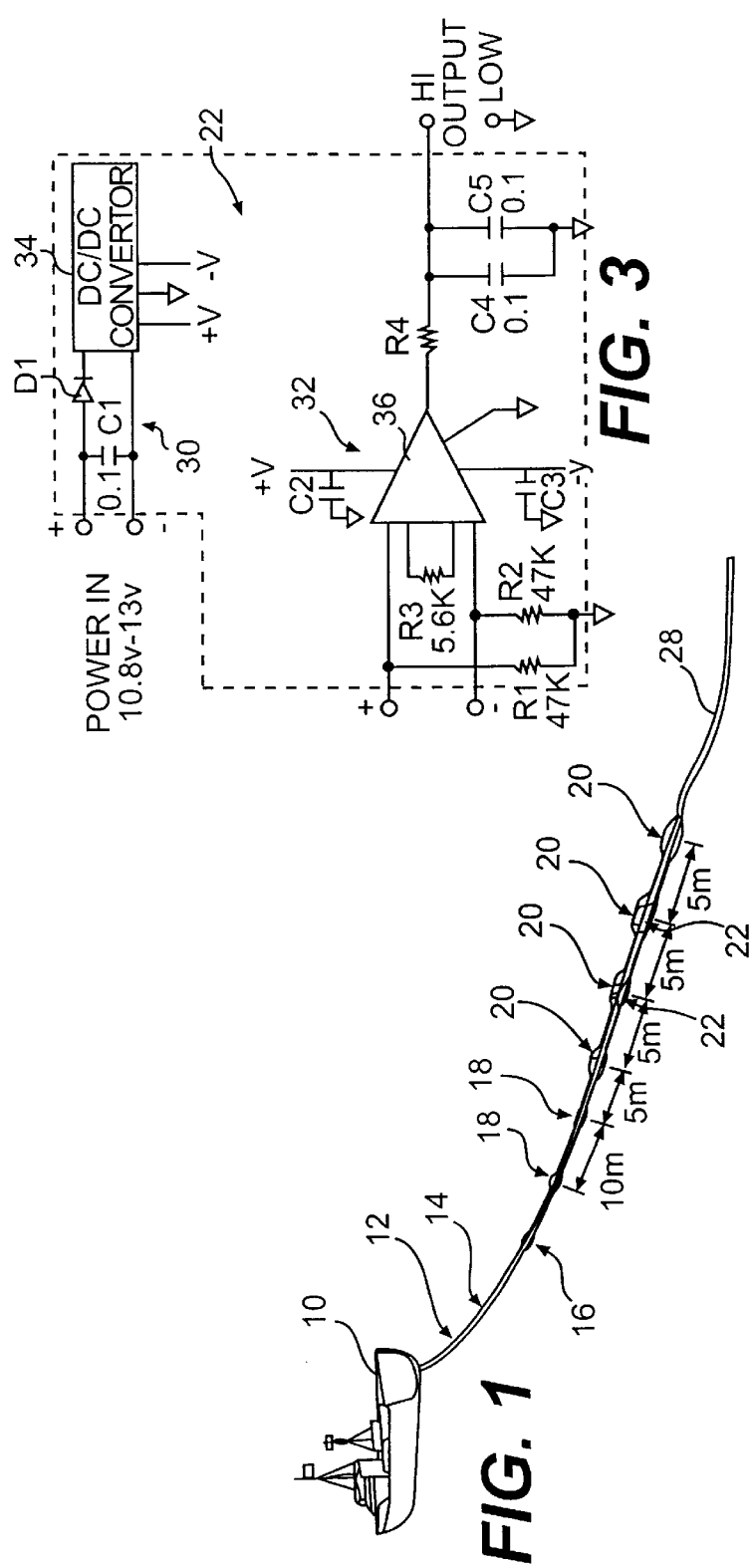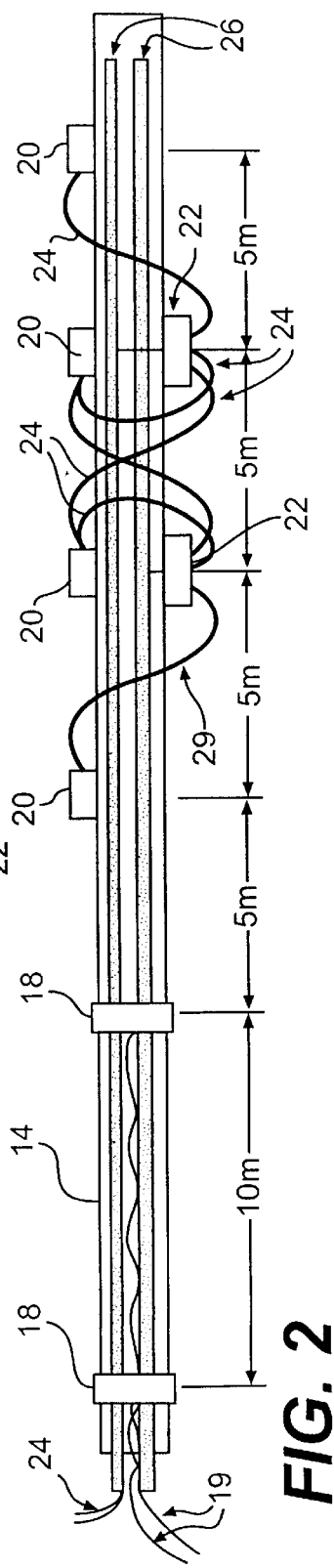

INDUCED POLARIZATION METHOD USING TOWED CABLE CARRYING TRANSMITTERS AND RECEIVERS FOR IDENTIFYING MINERALS ON THE OCEAN FLOOR

CROSS REFERENCE TO RELATED APPLICATIONS

This application discloses subject matter in common with U.S. application Ser. No. 09/102,281, which is entitled INDUCED POLARIZATION DETECTION SYSTEM FOR IDENTIFYING MINERALS ON THE OCEAN FLOOR, and filed concurrently herewith and which is hereby incorporated by reference.

FIELD OF THE INVENTION

The present invention relates to a method for detection or identification of metals, metallic minerals and the like on and beneath the ocean floor, using a towed streamer and employing induced polarization.

BACKGROUND OF THE INVENTION

A number of different methods have been used in the detection of metals and metallic minerals in sediments on the sea floor. The methods include seismic, magnetic and resistivity profiling techniques. Although these prior art methods are well developed, for a further discussion of some of these methods, reference is made, for example, to U.S. Pat. No. H1490 (Thompson, et al), U.S. Pat. No. 5,430,389 (Wynn, et al.), U.S. Pat. No. 4,617,518 (Srnka), U.S. Pat. No. 3,562,633 (Swain), U.S. Pat. No. 3,182,250 (Mayes), U.S. Pat. No. 3,052,836 (Postma), U.S. Pat. No. 2,872,638 (Jones), U.S. Pat. No. 2,839,721 (Dewitte) and U.S. Pat. No. 2,531,088 (Thompson). Briefly considering some of these patents, the Wynn, et al. patent discloses a sensor for detecting magnetic fields and current dipoles of materials and objects buried in sediment using a towed coil, while the Srnka patent discloses a towed system including an electric dipole current source which emits an alternating current and a plurality electric dipole detectors which measure potential differences between the detectors. The remaining patents generally relate to ocean floor logging methods using towed detectors which measure and log either changing potential differences or resistivity along the path of the towed detectors.

As discussed below, the method of the invention employs induced polarization (IP) in the identification process. The IP effect is a current-induced electrical response detected as a delayed voltage in certain minerals and, as described below, the method has been used for some time in the detection of these minerals in the ground. One manifestation of the response is that the voltage on an array of detectors or receivers lags the primary or inducing voltage (produced by a transmitter) by a finite amount of time. This is usually expressed as a phase-shift, i.e., a slight shift of the wavecycle between the transmitter and receiver, and is usually reported in units of milliradians, where one duty cycle of the transmitter is $2\pi$ radians.

For many decades it has been known that pyrite, most other metallic-luster minerals, and certain clays give rise to an IP effect. Geophysicists have taken advantage of this fact to discover and map large disseminated sulfide bodies (primarily copper and molybdenum) since the 1950's. The phenomenon is based on a complex double-layer interaction of ions in the electrolyte (the ground water) and the individual mineral surfaces. Because of this, IP is more sensitive to surface area than to volume and finely disseminated minerals make the best targets. An IP survey typically gathers both resistivity information, which is generally a measure of the porosity of the substrate, and polarization information, which is a measure of the reactivity of certain minerals (i.e., those described above) disseminated throughout the subsurface. Computer modeling can then be used to arrive at models that best fit the observed data acquired on the surface, with the purpose of providing a true map of the three-dimensional nature of the subsurface. The use of two physical characteristics (resistivity and polarization information) instead of just one makes the interpretation much more reliable.

There are, of course, a number of patents relating to the use of induced polarization in the detection of minerals and other materials and among these are the following: U.S. Pat. No. 5,671,136 (Willhoit), U.S. Pat. No. 4,467,642 (Givens), U.S. Pat. No. 4,041,372 (Miller, et al.), U.S. Pat. No. 3,984,759 (St. Amant, et al.).

SUMMARY OF THE INVENTION

In accordance with the invention, a method is provided which can be used to detect, on the sea floor and below the sea floor to depths of the order of about five meters, very small quantities (fewer than 1%) of certain economic titanium minerals as well as other metallic debris or materials including those containing fine-grained pyrite (e.g., waste sludge).

In accordance with the invention, a method is provided for detecting minerals and metal-containing materials which exhibit an induced polarization response, in and on the sediment of the sea floor, the method comprising: trailing a streamer cable in the sea behind a ship, the streamer cable including at least one transmitter and at least one receiver at the free end thereof and the streamer cable being trailed such that the free end is at least in close proximity to the sea floor; using the at least one transmitter to transmit an electrical current into the sediment of the sea floor; terminating the transmitting of said electrical current and using said at least one receiver to detect secondary signals produced by an induced polarization response of a source located on or in the sea floor in response to the termination of the electrical current; and processing the secondary signals to determine measurement parameters characteristic of the source of the secondary signals.

In one preferred embodiment of the method of the invention (referred to as the "towed" mode), the streamer cable is preferably towed in an expanding pattern to provide coverage of an area the sea floor. Advantageously, the streamer cable is towed back and forth in this mode along spaced paths in a grid or "lawn mower" pattern to provide the desired coverage.

Preferably, the method of the invention further comprises simultaneously acquiring positional data to provide an indication of the horizontal location of the source of a particular secondary signal. Acquiring of this positional data advantageously comprises acquiring data from the Global Positioning System.

In the towed mode, transmitting and interrupting of said electrical current is preferably carried out on a continuous basis during towing of the cable streamer over an area of interest and continuous detecting of secondary signals is carried out based thereon.

In a second preferred embodiment of the method of the invention, the streamer cable is positioned over a location on the sea floor which has been determined to contain an induced polarization source of interest, further induced polarization measurements are made at this position, using the at least one transmitter and the at least one receiver, over a range of frequencies, and the induced polarization measurements are used to generate a spectral signature of the source. Advantageously, the location in question is determined on the basis of secondary signals detected during towing of the streamer cable and the global positioning data acquired simultaneously with the detection of the secondary signals. Preferably, the signals produced by the induced polarization measurements are stacked and averaged, and thereafter signal amplitude and phase-shift information derived from the stack and averaged measurements is used to generate the spectral signature.

The transmitting and interrupting of the electrical current is preferably effected using a square wave voltage signal.

The secondary signals are advantageously amplified, using a pre-amplifier located at the free end of the streamer cable and providing common mode rejection, to provide an amplified secondary signal. The processing of the secondary signals preferably comprises processing steps wherein the amplified signal is Fourier transformed and then deconvolved against a calibration signal.

Although as was indicated above and is set forth in more detail below, the method of the invention can be used to detect and identify a number of different minerals and metal-containing materials on the sea floor, one aspect of the invention concerns the discovery that certain titanium containing minerals, and, most importantly, ilmenite, have a strong IP response. In an embodiment of the invention particularly useful in detecting ilmenite, a square wave transmitting signal is used during the towing mode which has a frequency of about 4 Hz.

Other features and advantages of the invention will be set forth in, or apparent from, the following detailed description of preferred embodiments of the invention.

BRIEF DESCRIPTION OF THE DRAWINGS

FIG. 1 is schematic perspective view of a ship towing or dragging a streamer in accordance with the method of the invention;

FIG. 2 is schematic side elevational view, drawn to an enlarged scale, of the active portion of the streamer of FIG. 1;

FIG. 3 is a schematic circuit diagram of one of the pre-amplifiers of FIGS. 1 and 2.

DESCRIPTION OF THE PREFERRED EMBODIMENTS

Figure 4:
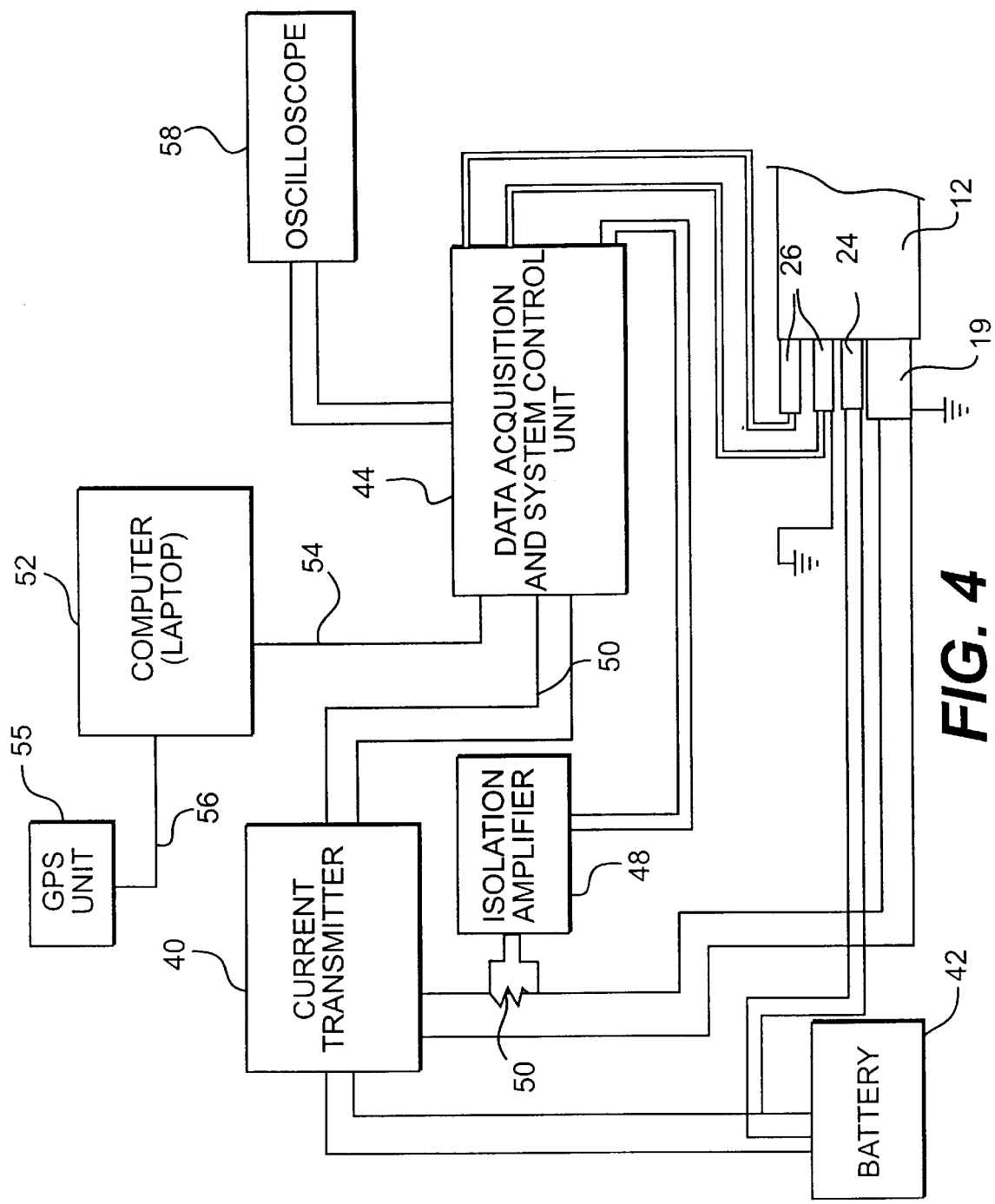
FIG. 4 is block diagram of a preferred embodiment of the on-board electronics of the induced polarization detection system used with the method of the invention.

Referring to FIG. 1, there is shown a streamer system which is preferably employed in the method of the invention. A ship, which is indicated at 10 and which can be any ship of a length longer than about 25 feet, is used to tow a streamer 12 including a multi-wire-stranded cable 14. The ship 10 includes an on-board digital stack and averaging data-acquisition system (not shown in FIG. 1) which is described below in connection with FIG. 4. The multi-wire-shielded cable 14 is used to carry a transmitted signal down the cable and to carry an amplified received signal back to the electronics aboard the ship 10, as is further described hereinbelow.

A weight 16 (10 kg in an exemplary embodiment) is affixed to cable 14 and is used to depress the towed cable 14. In this regard, computer modeling has shown that an insufficient signal penetrates the sediments of the sea floor if the streamer 12 "flies" more than about one meter above these sediments.

Cable 12 also carries a pair of spaced transmitter electrodes 18 which, in the exemplary embodiment under consideration, are spaced about 10 meters apart. Electrodes 18, which are also illustrated in FIG. 2, are preferably made of titanium wire so that the electrodes do not corrode with being used with about 2 to 5 amperes of electrical current. Electrodes 18 are connected to the inside of cable 14 in a waterproof manner, e.g., by using waterproof "take-outs" (not shown), so as to prevent seawater from penetrating into the cable under hydrostatic pressure and changing the electrical characteristics of the cable 14 while in use. As illustrated in FIG. 2, a shielded twisted pair 19 is used to supply power to transmitters 18. Preferably the shield twisted pair 19 comprises a ground-shielded twisted pair of twenty-two gauge wire designed to provide a square-wave current signal to the titanium electrodes 18 while having minimum cross-talk with the received signal coming back up the streamer 12.

As shown in FIGS. 1 and 2, four receiver electrodes 20 are affixed to cable 14 in equally spaced relationship. In the illustrated embodiment, the first or most proximal of the electrodes 20 is spaced about five meters from the most distal transmitter 18 and the receiver electrodes 20 are themselves spaced apart about five meters. The receiver electrodes 20 are non-polarizable, i.e., do not produce an arbitrary battery effect, when in use, due to corrosion and electrolysis. To this end, in a preferred embodiment, electrodes 20 are composed of silver wire immersed in a stable-base silver-chloride gel which is exposed to contact with the seawater. The electrodes 20 are encased in a heavy plastic sheath (not shown) to provide protection against abrasion and damage from sharp objects while still affording electrical contact with the seawater.

As is also shown in both FIGS. 1 and 2, a pair of common-mode-rejection differential pre-amplifiers 22 are used to remove common-mode noise by providing a reference electrode between the measurement electrodes 20. Twisted-pair wires 24 are used to provide power to the pre-amplifiers 22. Three input wires 24 are connected to each pre-amplifier 22 to implement the common-mode rejection arrangement wherein a reference electrode equidistant between receiver electrodes 20 is used to provide removal of common-mode noise from the received signal. Pre-amplifiers 22 also strengthen and condition the received signal which is returned through shielded coaxial cables 26 to minimize electrode cross-talk wherein the two-ampere transmitted signal would overwhelm and swamp the millivolt-level signals from receivers 20.

A first dipole is (n=0.5) is formed by the first (most proximal) triple group of receivers 20. If normal separation for each dipole is five meters, the first receiver group is located at half a dipole spacing from the closest transmitter 18. This spacing effectively allows sampling of sediments to an approximate depth of 2 meters below the sediment-water interface in seawater if the cable 14 is in contact with the seafloor. A second dipole is formed by the most distal triple group of receivers 20 which shares two electrodes with the first triple group. The electrode spacing is 5 meters (n=1) and effective sampling of sediments can be carried out down to approximately 5 meters below the sediment-water interface.

Referring again to FIG. 1, a drogue rope 28 is attached to towed cable 14 to stabilize the cable array while underway and to minimize cable whipping and undulation since such would contribute an artificial noise to the received signal.

Referring to FIG. 3, there is shown a schematic circuit diagram of a preferred embodiment of one of the common-mode-rejection differential amplifiers 22. As noted above, the amplifiers 22 are used on the active end of the marine IP streamer 12 to capture and condition the received signal and in the exemplary embodiment illustrated in FIG. 3, the amplifier provides a gain of ten. In the illustrated embodiment, power supply 30 for the pre-amplifier unit 32 includes a DC/DC converter 34 including a shunt capacitor C1 connected between the input leads and diode D1 connected in series with the positive lead, and provides power supply voltages +V and −V for the basic amplifier circuit 36. Amplifier circuit 36 includes positive and negative differential inputs between which shunt resistors R1 and R2 are connected to ground. A further resister R3 is connected as shown. Further capacitors C2 and C3 are respectively connected between the power supply connections +V and −V to ground, and two further capacitors C4 and C5 are connected between the amplifier output connection and ground, and a further resistor R4 is connected in series in this connection, as shown. The input voltage should be near 12 volts, and the input consists of a triple group of positive, negative, and reference electrodes (the latter of which is connected to the electrical ground of the pre-amplifier).

Referring to FIG. 4, there is shown a block diagram of the on-board electronics mentioned above. In FIG. 4, the armored streamer 12 is shown as including a plurality of shielded cables corresponding to those discussed above, viz., shielded coaxial cables or lines 19 which provides current to the transmitter 18, cables or lines 24 which provide power to the pre-amplifiers 22 and cables or lines 26 which carry the received signals. The shielded coaxial lines 19 are grounded and electrically shielded as much as possible to providing shielding from the transmitted signal. The non-ship ground is a sacrificial electrode (typically a copper plate) which is hung overboard so that the ground voltage of the electrical system is allowed to float independently of the electrical system of the ship, thereby reducing or eliminating another source of noise contamination.

Briefly describing the basic units of FIG. 4, as illustrated, cables 19 are connected to a current transmitter 40, cables 24 are connected to a battery 42 which is also connected to current transmitter 40, and cables 26 are connected to a data-acquisition and system control unit 44. The latter is connected through an isolation amplifier 48 to a shunt resister 50 connected in one of the connections to cable 19 and through a logic link 50 to current transmitter 40. A computer 52 (which is preferably a laptop) is connected through a data download connection 54 to the system control unit 44 and to a GPS unit 55 though an input connection or download cable 56. An oscilloscope 58 is also connected to the system control unit 44, to monitor signal quality.

Considering the particular elements or units of FIG. 4 in more detail, the DGPS data stream on the GPS download cable 56 is acquired by GPS unit 55 (which can be from any standard NEMA-183 encoded GPS device via a PCMCIA serial-port card) and is used to provide precise location information for the active end of the streamer 12 using Psoftware integration in the laptop computer 52. Laptop computer 52 acquires processed electrical data (resistivity and chargeability for each of the two different depth channels provided by the first and second receiver dipoles described above) via input connection or download cable 54, as well the GPS data stream from input connection 56, and combines these two data streams in real-time, displays the result, i.e., shows the operator what is happening, and stores the data for subsequent use and analysis.

The data acquisition and system control unit 44 is a GDP-32 device which is specialized to provide geophysical data acquisition and processing and is designed to acquire analog data from the IP streamer 12 and to convert these data into digital form. Unit 44 performs a Fourier transform on the converted signals and deconvolves the signals against a calibrate record, acquired before the data acquisition begins, in order to remove extraneous effects due to the cables 26 and unit 44 itself Unit 44 is programmed, via E-PROMs, to calculate resistivity and chargeability (the latter being a measure of the IP effect) for the two different channels at the same time and to provide the results in a continuous data stream as the streamer 12 is being towed over the ocean floor.

The oscilloscope 58 is used to monitor the received and transmitted signals to verify that there are no ground loops and that no extraneous noise is entering the system.

The current transmitter 40 is a ZT-20 current transmitter which is controlled by unit 44 and is designed to provide a precisely controlled square wave signal to cable 19. Data link 50 is a cable which allows unit 44 to control the timing and amplitude of the square wave signal produced by current transmitter 40.

The isolation amplifier 48 is an isolation optical amplifier which enables the square wave signal from current transmitter 40 to be precisely controlled by means of feedback from the sensing resister 50 to the unit 44. Because the transmitter signal is optically isolated from the received signal, there is no electrical noise, voltage offset, or crosstalk arriving at unit 44 from transmitter 40.

Battery 42 is a 12/24 volt battery which serves as the D.C. power source for current transmitter 40 and also provides, through separate lines, an independent D.C. voltage supply (about 12 volts) to the pre-amplifiers 22.

Turning now to the operation of the marine IP system described above, the IP system basically operates in one of two modes, a towed mode or "spectral" mode. In the towed mode, the streamer 12 is dragged by ship 10 along the sea floor, back and forth in a grid pattern in the manner of a lawn mower, so as to cover a large area. The data are acquired very rapidly at a single frequency (typically 4 Hz in the application discussed below) in a continuous sampling mode, at typical towing speeds of 3 knots or higher. A very large area can be covered in this manner in a very short time.

Before considering the spectral mode in more detail, the basic operation of the IP system which is common to both modes will be briefly considered. This basic operation, which should be evident from the discussion above, begins with the generation of a current for injection into the seawater and the sea floor sediment. The titanium-wire transmitter electrodes 18 are energized with a precisely controlled square wave voltage from current transmitter 40, resulting in the injection of several amperes of electrical current into the seawater. The cable 12 is dragged behind ship 10 and, as discussed in more detail elsewhere, is maintained in at least close proximity to the sea floor so that a significant portion of the transmitted current penetrates the sea floor sediment. As is also discussed in more detail elsewhere, metals and certain metallic-luster minerals such as ileminite ($FeTiO_3$) and pyrite (FeS) in the underlying sediments undergo a complex multi-layered reversible electrochemical adsorption of ions at the mineral-water interface under the stimulation of the transmitted signal from transmitters 18. When the square wave is turned off abruptly during the transmission duty cycle, the electrochemical reaction reverses and any subsequent secondary signal is detected using the non-polarizing Ag—AgCl receivers 20. This signal is amplified using the corresponding common-mode-rejection pre-amplifier 22 at the free end of cable 14. The signal is then sent back through cables 26 of towed cable 14 to the data acquisition and system control unit 44 where the signal is Fourier transformed and then deconvolved against a calibrate waveform to remove any extraneous effects of the ship 12 and the cables 19, 24 and 26. After this processing, the signal provides a resistivity measurement and a chargeability measurement approximately every one second as the cable is being towed across the sea floor. The receiver dipoles, i.e., the dipoles formed by receivers 20 and arranged in an array at increasing distances from the dipole pair of transmitters 18, provide different sensitivities to sources at different depths. Thus, the operator can, in effect, map the depth of the source anomaly in real time from the moving ship. In addition, the simultaneously acquired GPS data from input line 56 is used to provide precise horizontal locations.

After the initial survey, the ship 10 can be positioned using these GPS data to drape the streamer 14 over the source of discrete anomalies and a series of stationary measurements can be made using a range of frequencies to obtain characteristic spectral signatures as now will be described.

In the spectral mode, the streamer 12 is positioned over an area where either a vibrocore (an electro-acoustical transmitter) has picked up heavy placer signals, or a "hit", i.e., anomalous response, has been detected while operating in the towed mode. With the streamer 12 so positioned, spectral IP measurements are carried out. More particularly, a wide range of frequencies is acquired and sampled, by data acquisition unit 44, at this single position. The signals are stacked-and-averaged to minimize noise, and both amplitude and phase-shift are used to generate a unique "spectral signature" in the complex plane. In other words, an Argand diagram is created wherein the amplitude of each frequency point is plotted along the X or real axis and the phase-shift of each frequency point is plotted along the Y or imaginary axis. These spectral IP signatures are very distinctive and, with suitable laboratory calibration, enable characterization of the buried polarizer over which the streamer 14 passes. This means, in effect, that the buried object or mineral deposit causing the IP anomaly can be identified as in the towed mode. However, because a wide range of frequencies is being measured, the usual requirement is that the streamer 14 be held stationary in one spot for up to 15 minutes.

Where the position of interest is determined during the towed ode the required positioning of the ship 10 is achieved by using the GPS coordinates of the "hit" to place the ship 10 over the target. This can be accomplished by first moving the ship 10 up-current from the target, deploying the ship's anchor, then winching back out on the anchor until the ship 10 is positioned over the target. The streamer 12 is then lowered over the side and ship 10 pulls up on the anchor once more to deploy and stretch out the streamer 12 over the target (and to, of course, move the ship away from the target that is to be measured.)

Although, as discussed below, the invention is clearly not limited to the detection of these minerals, a further aspect of the invention concerns the discovery the titanium-bearing mineral ilmenite ($FeTiO_3$) and the thorium-bearing, rare-earth mineral monazite are both polarizable, i.e., responsive to IP. Ilmenite is a major source of titanium metal and titanium oxide used throughout the chemical and marine engineering industries. It has also been discovered that ilmenite has an IP reactive phase-shift maximum at 4 Hz. This frequency characteristic is critical to rapid remote mineral discrimination. It is noted that because of this frequency characteristic ilmenite is not easily detected with typical land-type IP systems since such systems of are generally optimized for pyrite which has a phase-shift peak at around 0.01 Hz. The streamer system described above can be used to directly detect titanium placer concentrations less than 1% by volume so that mining companies can know where, how large, how deep, and how thick the placer deposits are. In addition to titanium and monazite, as mentioned above, refractory minerals such as zircon and staurolite, platinum group elements and gold are often found in heavy placers. Further, replacement beach sand can also be mapped. Further, the marine IP method of the invention can be used to detect buried metallic objects and to map collections of urban wastes, which are metal-rich and anoxic, on the sea floor. It is noted with respect to the former that buried metal objects show up as a positive shift and a coincident lowered resistivity anomaly in contrast to ilmenite which shows up as an unchanged resistivity but a strong positive phase-shift.

One further specific application of the invention would be in general sea floor survey work needed for both pipeline construction and the laying of telecommunications cable. Side-scan sonar represents one major competing system for this purpose, but it is more expensive to install on a ship and requires combination with sea floor sampling devices and expensive, time-consuming follow-on laboratory work. By comparison, IP detection provides immediate results at significantly lower costs.

Another specific application of the method of the invention is in the detection of buried unexploded ordnance. Such ordnance cannot be seen by divers (and usually not even by magnetometers) operating above the sea floor but such ordnance can be mapped and characterized using the method of the invention by employing a grid or lawn mower type of survey or ship travel pattern such as described above.

In use of the streamer 12 in continuous profiling of the sea floor, it is important that this profiling be carried out with the streamer 12 directly on, and even in, the sea floor. Thus is in sharp contrast to current practice in sea-borne seismic, magnetic and resistivity profiling systems where, because of abrasion and the potential for damage from, e.g., wrecks and reefs, the systems are designed to pass through the water well above the sea floor and thus provide imaging of the sediment surfaces from a distance. Because of the high conductivity of seawater, there is tremendous electrical current channeling between transmitter electrodes and consequently little transmission of the transmitted signal into the sediments unless the electrodes are in direct contact with the sediments. Although a floating streamer is acceptable for crude resistivity profiling, the very subtle, relatively faint signals from the IP effect generally fall beneath the noise threshold unless the profiler (streamer) is in direct contact with the sea floor sediments. In an exemplary embodiment, the streamer actually trenches a path of about 5 cm. (about 2 inches) in depth into the sediments. On land, IP measurements require that the electrodes be dug or pounded into the ground and that wires be then laid out, connected and measurements made. The method of the invention takes advantage of the fact that, at sea, the conductivity of the medium eliminates the need for implanting the electrodes and, theoretically, more IP measurements can be made in a week than have been made on land during the past 30–50 years.

Although the present invention has been described relative to specific exemplary embodiments thereof, it will be understood by those skilled in the art that variations and modifications can be effected in these exemplary embodiments without departing from the scope and spirit of the invention.

What is claimed is:

1. A method for detecting minerals and metal-containing materials which are located in and on a sea floor having a sea floor sediment and which exhibit an induced polarization response, said method comprising:

trailing a streamer cable in the sea behind a ship, said cable having a free end and including at least one transmitter and at least two receivers disposed in spaced relation at said free end and comprising four electrodes arranged together in groups of three to form first and second dipole groups each including a shared electrode and a central reference electrode and said cable being trailed such that said free end and said at least two receivers are positioned in the sediment on the sea floor;

towing said streamer cable back and forth along spaced paths in an expanding grid pattern to provide large area coverage of the sea floor;

using said at least one transmitter to transmit an electrical current into the sediment of the sea floor;

terminating the transmitting of said electrical current and using said at least two receivers to detect secondary signals produced by an induced polarization source located on or beneath the sea floor in response to said terminating of the electrical current; and processing said secondary signals using stacking and averaging of the secondary signals to determine measurement parameters characteristic of the source of the secondary signals.

2. A method as claimed in claim 1 further comprising simultaneously acquiring positional data to provide an indication of the horizontal location of the source of a said secondary signal.

3. A method as claimed in claim 2 wherein said acquiring of said positional data comprises acquiring data from the Global Positioning System.

4. A method as claimed in claim 1 wherein said transmitting and terminating of said electrical current and detecting of said secondary signals are carried out on a continuous basis during towing of said cable streamer over an area of interest.

5. A method as claimed in claim 1 wherein said transmitting of said electrical current and said terminating of said current is effected using a square wave voltage signal.

6. A method as claimed in claim 1 wherein said secondary signals are amplified, using a pre-amplifier located at said free end of said cable and providing common mode rejection, to provide an amplified secondary signal.

7. A method as claimed in claim 6 wherein processing of said secondary signals comprises processing steps wherein said amplified signal is Fourier transformed and then deconvolved against a calibration signal to remove effects of streamer cable and said at least one transmitter and said at least one receiver.

8. A method as claimed in claim 1 wherein said streamer cable towed behind the ship and is weighted such that the distal end thereof trenches a path in sediments of the sea floor.

9. A method as claimed in claim 1 wherein said method comprises simultaneously gathering data from each of said electrodes.

* * * * *